Patented Nov. 26, 1935

2,022,290

UNITED STATES PATENT OFFICE 2,022,290

SHAFT MOUNTING

Samuel R. Large, Bristol, Conn., assignor, by mesne assignments, to General Motors Corporation, Detroit, Mich., a corporation of Delaware Application December 5, 1931, Serial No. 579,230

7 Claims. (Cl. 74—424)

This invention relates to shaft mountings, being particularly applicable to pinion shafts for the differential gearing of motor cars, and comprises all of the features of novelty herein disclosed. An object of the invention is to provide simple, reliable and inexpensive mountings for pinion shafts and the like. Another object is to provide a shaft mounting having advantageous features relating to adjustment and assembly, especially in motor cars. To these ends and to improve generally upon devices of this character, the invention consists in the various matters hereinafter described and claimed.

In its broader aspects, the invention is not necessarily limited to the particular constructions selected for illustrative purposes in the accompanying drawings in which Fig. 1 is a sectional view taken about on line 1—1 of Fig. 2 through the forward portion of an axle casing.

Fig. 2 is an end view of Fig. 1.

Fig. 3 is a sectional view taken about on line 3—3 of Fig. 4 and showing a modified construction.

Fig. 4 is an end view of Fig. 3.

Fig. 5 is a sectional view of a modified construction and

Fig. 6 is a bottom plan view of a locking plate.

The numeral 2 indicates a portion of a differential casing having reinforcing ribs 4, and numeral 6 indicates a forwardly projecting tubular extension having reinforcing ribs 8. Bosses 10 provide means for supporting brake rods. The casing contains the usual differential ring gear (not shown) meshing with a pinion 12 on a pinion shaft 14 which is splined at 16 for connection with a coupling. The tubular extension 6 has rivet holes 17 for connection with the usual torque tube (not shown).

On the shaft 14 is sleeved a wide, double-row bearing including a one-piece inner race ring 18 clamped against a shoulder by a nut 20. The inner race ring has end thrust shoulders providing angular contact raceways 22 for two rows of rolling elements herein shown as balls 24. Cooperating angular contact raceways 26 are provided on a one-piece outer race ring 28 and the angles of contact diverge towards the axis of the shaft 14 to give a bracing effect. The bearing is preloaded, that is, the rolling elements are assembled under an initial load, as by selecting balls that are too large to fit between the raceways without compression. The amount of the initial load is such that, under the expected combination of thrust and radial load on the pinion, some initial load remains and so firm contact of balls and races is maintained and the pinion shaft is not deflected. Thus a single bearing can be made to suffice where prior constructions required a plurality and the single bearing simplifies the shaft mounting and saves expense.

The bearing is secured to the pinion shaft and then slipped into a casing recess or seat 29 from the rear, the outer race ring having a sliding fit and being located by a thrust washer 30 and spacing washers 32 of suitably selected aggregate thickness interposed between the end of the race ring and a shoulder at the end of the recess. The race ring projects or overhangs a little beyond the recess or seat 29 and is engaged by a clamping plate in the form of a dished washer 34 whose outer periphery lies in a recess 35. The slanting side wall of the washer 34 acts as a cam in co-operation with coned surfaces 36 on a plurality of screw bolts 38. The bolts are threaded in tapped openings extending radially through bosses 40 and are secured by lock nuts 42. The shoulder at the end of the seat or recess 29 faces to the rear and the assembled pinion shaft and bearing is inserted as a unit from the rear.

Figs. 3 and 4 show a modified construction wherein the outer race ring 28 is clamped by a series of bolts 44 extending through longitudinal holes in bosses or ribs 46 on the axle casing. The bolts have square heads 48 to prevent rotation, the heads projecting radially across the overhanging end of the outer race ring 28 and being drawn against it by nuts 50 having lock washers. The bearing is located, as before, by a thrust washer 30 and spacing washers 32 of selected aggregate thickness. The casing 2 is reinforced by ribs 52 and the tubular extension 6 has a terminal stiffening rib 54.

Figs. 5 and 6 show a further modification. The outer race ring of the bearing carries oil shields 60, which retain grease in the bearing, and a slinger 62 is interposed between the inner race ring and the pinion so that the grease churned up by the gears will be kept out of the bearing. The outer race ring is carried in a sleeve 64 and abuts against a flange 66 thereof. The bearing is locked in the sleeve 64 by a second sleeve 68 which is externally threaded in an internally threaded extension of the sleeve 64. Wrench openings 70 in the sleeve 68 provide means for screwing the sleeves together and a set screw 72 locks the sleeves after adjustment. The splined portion 16 of the pinion shaft is secured by a rivet to a coupling 74. A suitable seal 76 is pressed into the sleeve 68 against an internal shoulder Nov. 26, 1935.    J. LEHMAN    2,022,291
BOILER STAND
Filed June 27, 1933    2 Sheets-Sheet 1
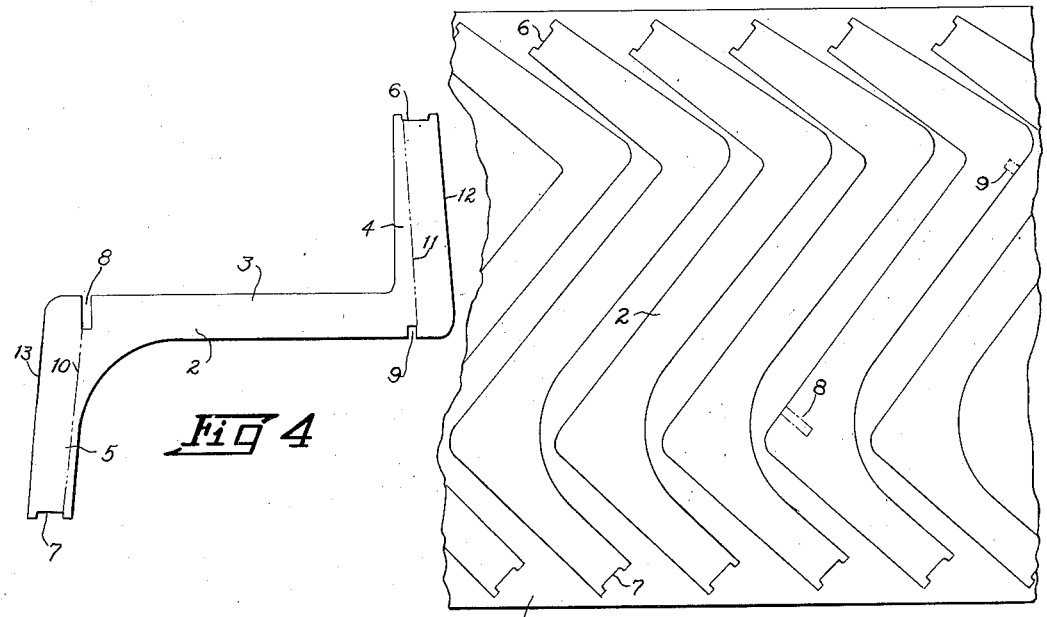
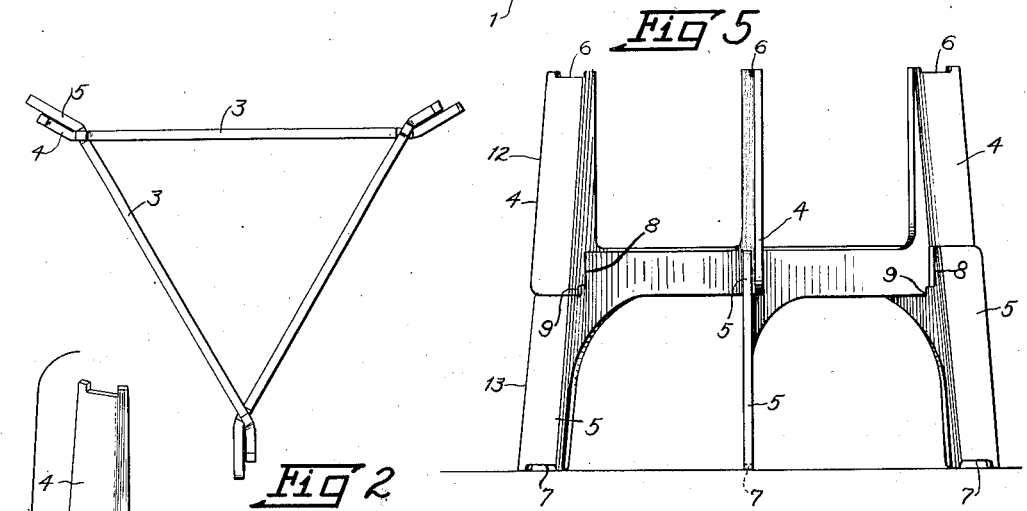
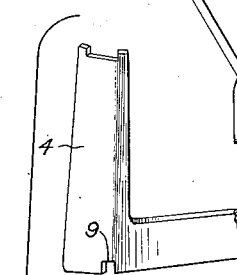
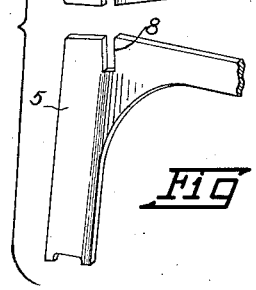
INVENTOR.
Joseph Lehman.
BY Slough and Caufield
ATTORNEY.

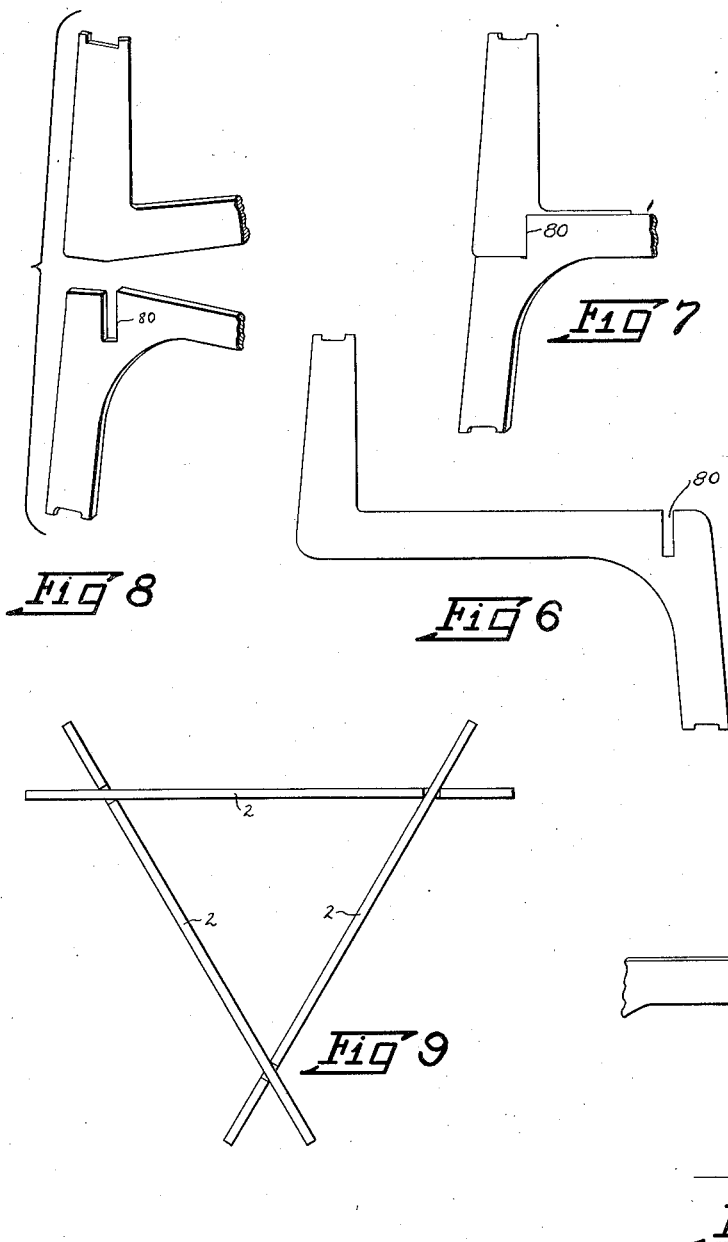

Patented Nov. 26, 1935

2,022,291

UNITED STATES PATENT OFFICE 2,022,291

BOILER STAND

Joseph Lehman, Cleveland Heights, Ohio, assignor to The Consolidated Iron-Steel Mfg. Company of 1932, Cleveland, Ohio, a corporation of Ohio Application June 27, 1933, Serial No. 677,835

9 Claims. (Cl. 248—165)

This invention relates to supports, supporting stands and the like, and particularly to boiler stands.

The well known vertical cylindrical boiler commonly installed in connection with domestic heating plants to provide a supply of hot water for the kitchen, bathroom, lavatories etc. is usually supported upon a stand resting upon the floor, and supporting the lower end of the boiler a foot or so above the floor. Many designs of such stands have been proposed and patented, the object sought by the numerous inventors being to produce a stand which could be manufactured cheaply and which could be adjusted to support boilers of either of two standardized diameters.

Such boiler stands have been provided having in general three legs and adapted to support the standard small size boiler on the upper ends of the legs and adapted to be turned upsidedown to support the standard large size boiler on the other ends of the legs.

It is an object of this invention to provide a boiler stand of this general class and type which can be manufactured at the very minimum of cost.

Another object is to provide such a boiler stand which can be constructed from three identically formed pieces which may be transported to the point of use disassembled, and which may be assembled by the user without additional parts.

Another object is to provide a boiler stand of the class referred to formed entirely from a plurality such as three identical sheet metal stampings.

Another object is to provide a boiler stand of the class referred to which may be made from a plurality of identical sheet metal stampings of such shape as to reduce to the minimum the waste in the sheet or bar from which they are stamped.

Another object is to provide a boiler stand of the class referred to comprising a plurality such as three identical or similar pieces adapted to be assembled together in a mutually interlocked manner without accessory securing means.

Another object is to provide an improved method for making boiler stands whereby a great quantity of identical parts may be made by cutting and pressing operations from sheet metal and any three of which parts may be assembled into a complete three-legged boiler stand of the class referred to without accessory attaching or securing means and without supplemental processing operations.

Other objects will be apparent to those skilled in the art to which my invention appertains.

My invention is fully disclosed in the following description taken in connection with the accompanying drawings, and in which:

Fig. 1 is a side elevational view of a complete boiler stand embodying my invention;

Fig. 2 is a top plan view of the stand of Fig. 1;

Fig. 3 is a view illustrating a manner of assembling parts from which the stand of Figs. 1 and 2 is composed;

Fig. 4 is a view illustrating a flat sheet metal blank from which the boiler stand of Figs. 1 and 2 may be constructed;

Fig. 5 is a view illustrating the layout of the blank of Fig. 4 upon a sheet or bar of sheet metal, and illustrating the economy of material made possible thereby;

Fig. 6 is a view similar to Fig. 4 illustrating a modification;

Fig. 7 is a fragmentary view similar to Fig. 1 illustrating a stand made from the blank of Fig. 6;

Fig. 8 is a view similar to Fig. 3 illustrating the manner of assembling the stand of Figs. 6 and 7;

Fig. 9 is a view illustrating a modification which may be employed for the stand of Fig. 1 or Fig. 3;

Fig. 10 is a fragmentary view similar to a part of Fig. 1 illustrating a modification.

Referring to the drawings, the stand of the embodiment of Figs. 1 to 4 will be described in connection with the process of making it.

A sheet or bar of sheet metal, 1, of suitable thickness such for example as ⅛" or 3/16" has cut or punched therefrom a plurality of blanks 2. As is plainly shown in Figs. 4 and 5, the blanks are of Z-shape. The shape of the blanks 2 and the extent of the different parts thereof is predetermined so that a succession of such blanks may be stamped from the sheet 1 in mutually nested relation whereby the waste from the sheet 1 is minimized, as clearly illustrated in Fig. 5 where a plurality of the blanks 2 is laid out on the sheet 1.

Each blank 2 comprises a transverse portion 3, an upwardly extending limb 4 at one end of the portion 3 and a downwardly extending limb 5 at the other end thereof. A flat bottomed recess 6 and a similar recess 7 are formed in the extremities of the limbs.

A relatively deep notch 8 is formed in the upper edge of the portion 3 adjacent its left end and a relatively shallow notch 9 is formed on